United States Patent
Bettis et al.

(10) Patent No.: US 7,970,109 B2
(45) Date of Patent: *Jun. 28, 2011

(54) AUTO BLOCK AND AUTO DISCOVERY IN A DISTRIBUTED COMMUNICATION SYSTEM

(75) Inventors: Sonny R. Bettis, Lawrenceville, GA (US); Philip L. Lowman, Ellijay, GA (US); James H. Spencer, Tucker, GA (US)

(73) Assignee: Movius Interactive Corporation, Johns Creek, GA (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/419,668

(22) Filed: Apr. 7, 2009

(65) Prior Publication Data

US 2010/0091958 A1 Apr. 15, 2010

Related U.S. Application Data

(63) Continuation of application No. 11/733,643, filed on Apr. 10, 2007, now Pat. No. 7,561,678, which is a continuation of application No. 11/170,536, filed on Jun. 29, 2005, now Pat. No. 7,221,740.

(60) Provisional application No. 60/584,070, filed on Jun. 30, 2004.

(51) Int. Cl.
 *H04M 1/64* (2006.01)
(52) U.S. Cl. ....... 379/88.17; 379/2; 379/32.02; 370/354
(58) Field of Classification Search ........... 379/2, 32.02, 379/88.17, 352–356
 See application file for complete search history.

(56) References Cited

U.S. PATENT DOCUMENTS

| 5,963,618 | A  | * | 10/1999 | Porter ...................... 704/270.1 |
| 6,333,931 | B1 | * | 12/2001 | LaPier et al. ................ 370/385 |
| 7,221,740 | B2 |   | 5/2007  | Bettis |
| 7,561,678 | B2 |   | 7/2009  | Bettis |
| 2003/0235183 | A1 | | 12/2003 | Skelton |

FOREIGN PATENT DOCUMENTS

| EP | 1347626 A2 | 9/2003 |
| WO | 03040942 A1 | 5/2003 |

* cited by examiner

*Primary Examiner* — Simon Sing
(74) *Attorney, Agent, or Firm* — Smith Risley Tempel Santos LLC; Gregory Scott Smith; Matthew T. Hoots

(57) ABSTRACT

A voicemail system enabling various components of the voicemail system to be distributed geographically yet operate as a seamlessly integrated system is disclosed. A signal gateway interfaces with a telephone network. In addition, one or more media servers interface with the signal gateway as well as the telephone network. The signal gateway is configured to block calls to malfunctioning media servers. The signal gateway monitors the media servers, and responsive to determining that a media server has malfunctioned, the signal gateway initiates auto-blocking such that the telephone network does not route calls to the malfunctioning media server. In addition, the signal gateway is configured to auto-detect a media server responsive to the media server being initialized. The voicemail system can include a variety of other elements, such as one or more system management units and one or more central data and message store systems. Each of the elements in the voicemail system communicate with each other over an internet protocol type network. Any functions in the various elements that require interfacing with the telephone network are simply handled through the signal gateway.

10 Claims, 3 Drawing Sheets

AUTO BLOCK AND AUTO DISCOVERY IN A
DISTRIBUTED COMMUNICATION SYSTEM

CROSS-REFERENCE TO RELATED APPLICATIONS

This application is a continuation of the United States patent application filed on Apr. 10, 2007 and assigned Ser. No. 11/733,643, now U.S. Pat. No. 7,561,678 which application is a continuation of the United States patent application filed on Jun. 29, 2005 and assigned Ser. No. 11/170,536, now issued U.S. Pat. No. 7,221,740, which application claims priority to United States Provisional application for patent entitled, "Auto Block and Auto Discovery Functions," filed on Jun. 30, 2004 and assigned Ser. No. 60/584,070, which are all incorporated herein by reference.

TECHNICAL FIELD

The present invention is generally related to a voice messaging system and more particularly, is related to a voice messaging system with geographically dispersible elements that provides Auto Block and Auto Discovery capabilities.

BACKGROUND OF THE INVENTION

Over the past several decades, voicemail has expanded and established itself as a key element in the successful operations of most businesses. The typical voicemail system is composed of elements that must communicate with each other and thus, must be co-located. This can be a great disadvantage for companies that have geographically dispersed offices. Establishing a separate system at each office can be a costly endeavor as duplicative hardware is purchased and maintained at each site. Furthermore, the logistics for inter-office voicemail access can be complex. Thus, there are advantages to implementing a distributed voicemail system that allows various elements of the distributed voicemail system to be geographically distributed and shared while operating as a seamlessly integrated system. With a distributed architecture however, new challenges arise. Since elements within the voicemail system are no longer co-located, provisioning and maintenance of equipment become a challenge as elements may be, and frequently are, separated by long distances.

Voice messages may be lost if calls coming from a telephone network such as a public switched telephone network (PSTN) or cellular network, among others, are not properly processed due to unknown equipment failure. Today, a typical voicemail system includes a server that terminates communication links such as multiple T1 links from a telephone network. The server is normally in two-way communication with the telephone network, and the server is normally configured to provide an alert when one of the communication links with the telephone network fails such that communications can be rerouted through other operable communication links. However, if the server itself malfunctions, then there is no alert to re-route incoming calls. Thus, there is a need in the art for detecting equipment failure and rerouting calls coming from telephone networks before the calls reach the distributed voicemail system. Furthermore, voicemail systems must be easily scalable in order to meet dynamic capacity requirements while not resulting in down time for provisioning. Therefore, there is also a need for inserting new elements into the system on the fly.

SUMMARY OF THE INVENTION

Some embodiments of this invention provide a distributed voicemail system having Auto Block and Auto Discovery capabilities. During normal operations, at least one media server of the distributed voicemail system is communicatively linked to a telephone network (or multiple telephone networks). The media server has at least one component that terminates links to the telephone network(s). An element of the distributed voicemail system is adapted to monitor at least the media server, and responsive to determining that the media server has failed, a failure signal or message is provided to the telephone network, thereby notifying the telephone network that the media server has failed. Responsive to the failure signal, the telephone network reroutes voice channels terminated by the failed media server, thereby avoiding dropped calls.

In addition, some embodiments of this invention provide a distributed voicemail system having Auto Discovery capabilities. When new elements such as media servers are inserted and operational within the distributed voicemail system, they are detected, thereby making their resources immediately available without the need to shut down the system and provision the new element.

When an error or communication breakdown is detected, an element of the distributed voicemail system such as a signal gateway (SG) conducts a discovery process to find out if the failure is due to the SG or another element in the distributed voicemail system. This serves to isolate the problem and aids in the troubleshooting process. In general, elements of the distributed voicemail system such as the SG can communicate with other elements of the distributed voicemail system over a network such as an IP network to issue status or health-check commands and thus determine if an element is working properly. Prior to removing a particular element from the system, the SG will try multiple times to communicate with the element and in some embodiments, attempt to resolve any problems that may be causing the element to malfunction (e.g. issue a system reset command).

DETAILED DESCRIPTION OF THE INVENTION

Auto Block.

Figure 1:
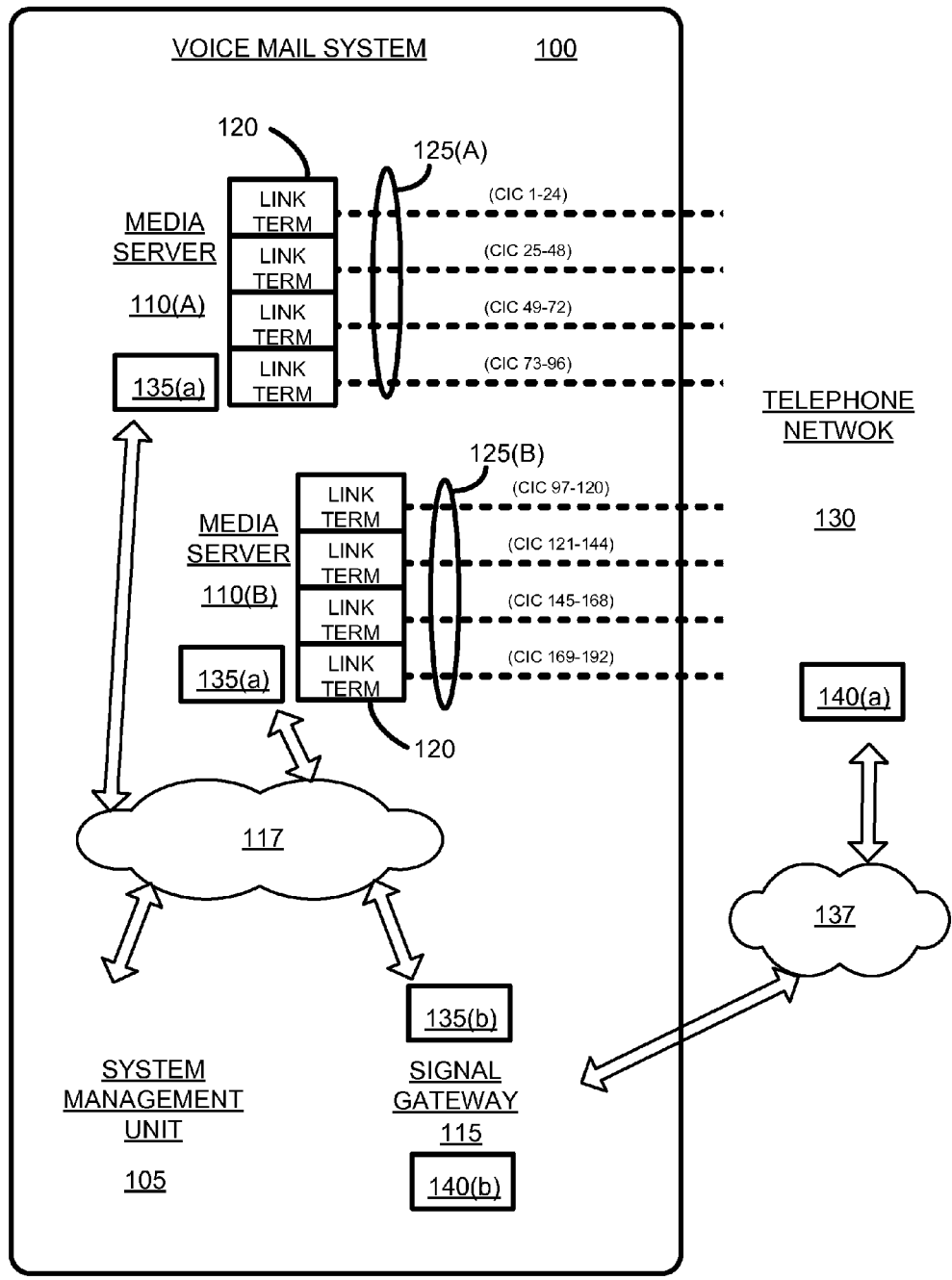
FIG. 1 is a block diagram illustrating an exemplary embodiment of a distributed voice messaging system in communication with a telephone network.

In some embodiments, a distributed voicemail system has the capacity to "auto block", which effectively removes malfunctioning equipment from the system in an automated fashion. FIG. 1 is a diagram illustrating selected elements of a distributed voicemail system 100. The distributed voicemail system 100 includes a system management unit (SMU) 105, media servers (MSs) 110(A) and 110(B), and a signal gateway (SG) 115. The SMU 105, the MSs 110(A) and 110(B), and the SG 115 are in communication with each other over a network 117. Typically, the network 117 is a computer network or the like, and typically, communications over the network 117 are performed in accordance with well known protocols such as, but not limited to, Internet Protocol (IP).

Among other things, the SMU 105 monitors the network 117 and provides upper level management of elements of the distributed voice mail system 100. For example, the SMU 105 provisions voice mail accounts for users of the distributed voice mail system 100. Typically, messages for a voice mail account are stored in a central data and message storage server (not shown). In addition, the SMU 105 receives element-initiation and element-update messages. When an element of the voicemail system 100 is brought online, the element sends an element-initiation message to the SMU 105. The SMU 105 uses element-initiation messages to determine, among other things, the elements of the voice mail system 100 and to determine, among other things, the capabilities and functions of the elements. When an element of the voicemail system 100 is changed, the changed element sends an element-update message. The SMU 105 uses the element-update message to determine, among other things, the updated capabilities and functions of the changed element. Among other things, changes to an element include a component failure of the element and/or replacement of a failed component of the element and/or the addition of a component (or components) to the element and/or the removal of a component (or components) from the element. Additionally, the SMU 105 provides the SG 115 with information regarding the MSs 110(A) and 110(B).

The MSs 110(A) and 110(B) include components such as link-termination components 120. The link-termination components 120 provide termination points for communication links 125 coming from a telephone network (TN) 130 such as, but not limited to, a Public Switched Telephone Network (PSTN). For the sake of clarity, the communication links 125 will be described as T1 link, but that description is intended as a non-limiting description, and those skilled in the art are aware of alternative communication links such as, but not limited to, T1C, T2, T3, T4, PRI, or other similar telecommunication links. Each T1 link 125 contains 24 carrier identification codes (CICs), which are associated with corresponding voice channels over which calls are conducted.

When an MS 110 is first initialized, the MS 110 sends the SMU an element-initialization message, which includes a list of CICs that the MS 110 is terminating, and the SMU 105 provides the SG 115 with the CIC list. In addition, the MS 110 establishes a client connection with the SG 115. Among other things, the SG 115 operates to make individual elements in a Distributed IP Architecture appear as a single entity.

Communication between the MS 110 and the SG 115 is accomplished over the network 117. In some embodiments, the MS 110 and SG 115 communicate over the network 117 via signaling transport (SIGTRAN) interfaces 135(A) and 135(B). SIGTRAN is an Internet Engineering Task Force (IETF) specification for carrying Signaling System 7 (SS7) messages over an IP network. Communication between the SG 115 and the TN 130 is accomplished over a second network 137. For the sake of clarity, the second network 137 is described as employing SS7 interfaces 140(A) and 140(B), which are included in the telephone network 130 and SG 115, respectively.

In some embodiments, among other things, the SG 115 monitors the operation of the MS 110 using an "intelligent heartbeat", which is generated by the MS 110. Basically, in one embodiment, the "intelligent heartbeat" is comprised of normal communications and a "heartbeat" message. During normal operations, the MS 110 communicates with the SG 115, and the SG 115 uses the normal communications to verify that the MS 110 is operating. However, MS 110 is also configured to send a "heartbeat" message to the SG 115 when it has not sent a communication to the SG 115 within a predetermined period of time. Thus, through use of the normal communications and the "heartbeat," the SG 115 monitors the MS 110 to verify that the MS 110 is operating correctly. If a period of time lapses without any traffic (normal communications and/or "heartbeat" messages) from the MS 110 being detected, the SG 115 will "ping" the MS 110, i.e., the SG 115 will send a command to the MS 110 to solicit a response. If a response is not received, then the SG 115 concludes that the MS 110 is not functioning properly. In some embodiments, the SG 115 pings the MS 110 a predetermined number of times, and if the SG 115 does not receive a response, then the SG 115 determines that the MS 110 is not functional. Thus, the intelligent heartbeat is used to monitor for any equipment failures.

In some embodiments, the SG 115 monitors the MS 110 via a conventional heartbeat generated by the MS 110. In other words, the MS 110 generates a "heartbeat" message or signal which the MS 110 transmits to the SG 115 over the network 117, and the SG 115 uses the message to determine that the SG 115 is functioning. Typically, the MS 110 transmits a message on a periodic or quasi-periodic basis. For example, a message might be transmitted every second or so, or at a shorter interval or a longer interval.

In yet other embodiments, the SG 115 is adapted to "ping" the MS 110. Responsive to receiving a "ping" message from the SG 115, the MS 110 responds with an answer message. Upon receiving the answer message, the SG 115 determines that the MS 110 is functioning. In an exemplary embodiment, the SG 115 pings the MS 110 every second or so, or at shorter or longer intervals.

Figure 2:
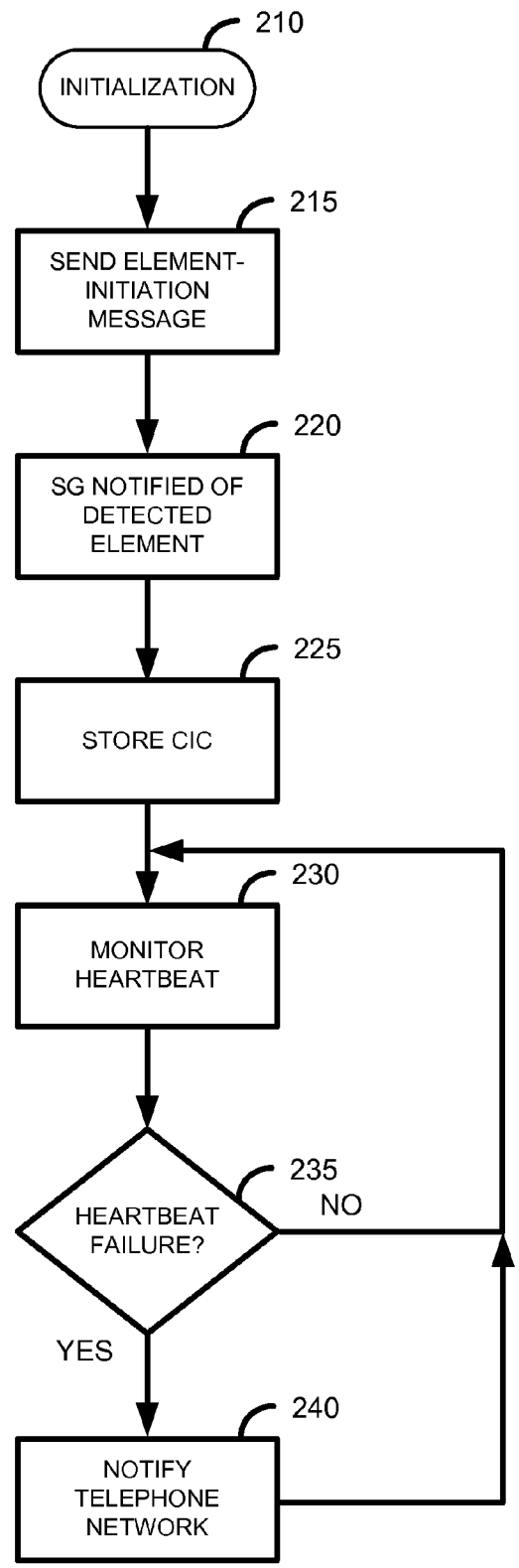
FIG. 2 is an exemplary flow diagram for performing auto block

FIG. 2 is a flowchart illustrating an exemplary embodiment of the distributed voicemail system 100 performing Auto Block. In step 210, the system is initialized. Next, in step 215, the MS 110 sends an element-initiation message, i.e., a notification of its presence and a list of all CICs which are terminated by that MS 110. The notification of its presence and the CIC list are sent to the SMU 105.

In step 220, the SMU 105 then notifies the SG 115 that a particular MS 110 has been detected and forwards the CIC list to the SG 115, and in step 225, the SG 115 stores the CIC list for particular MS 110 in a table.

After storing the CIC list for a particular MS 110, the SG 115 begins to monitor the "heartbeat" of the particular MS 110 in step 230. In step 235, the SG 115 determines whether there is a "heartbeat" failure. In the event that the "heartbeat" has not failed, the SG 115 continues to monitor the "heartbeat." On the other hand, in the event of a heartbeat failure, in step 240, the SG 115 notifies the telephone network 130 to block all calls over the CICs terminated by the MS whose heartbeat has stopped. In one embodiment, this is accomplished by the SG 115 sending an SS7 BLOCK message to the telephone network 130 to stop routing calls through the effected CICs. At this point, calls to the CICs terminated by the malfunctioning equipment are blocked. This is analogous to the provision in the SS7 protocol that allows for blocking a circuit if a T1 fails; however, in this embodiment, this function is performed on an element level. Thus, this aspect of the present invention detects malfunctioning equipment in the voicemail system 100, alerts the telephone network 130 to cease using the CICs that are associated with that equipment, thereby effectively eliminating malfunctioning equipment from the voicemail system so that the telephone network 110 can deliver calls reliably.

It should be remembered that a variety of "heartbeat" schemes can be employed in the voicemail system 110. For example, in one embodiment, each MS 110 generates a "heartbeat," and the SG 115 monitors the heartbeats of each of the MSs 110(A) and 110(B). In some embodiments, the heartbeat for a particular MS 110 may simply consist of a periodic or quasi-periodic "STATUS OK" message generated by the particular MS 110. In other embodiments, the SG 115 employs a combination of normal communications from the particular MS 110 to the SG 115 and a "heartbeat" message from the particular MS 110, wherein the "heartbeat" message is generated by the particular MS 110 on an as-needed basis. For example, if the particular MS 110 has not provided the SG 115 with normal communications for a period of time, then the MS 110 will generate a "heartbeat" message. In other embodiments, the SG 115 periodically or quasi-periodically "pings" the particular MS 110 and uses response messages to determine the status of the particular MS 110.

Auto Discovery.

This aspect of the present invention advantageously allows elements, such as Media Servers 110(A) and/or 110(B), to be plugged into the distributed voicemail system 100 or removed from the distributed voicemail system 100 on the fly. This results in seamless and flexible scalability in order to meet higher capacity demands.

Figure 3:
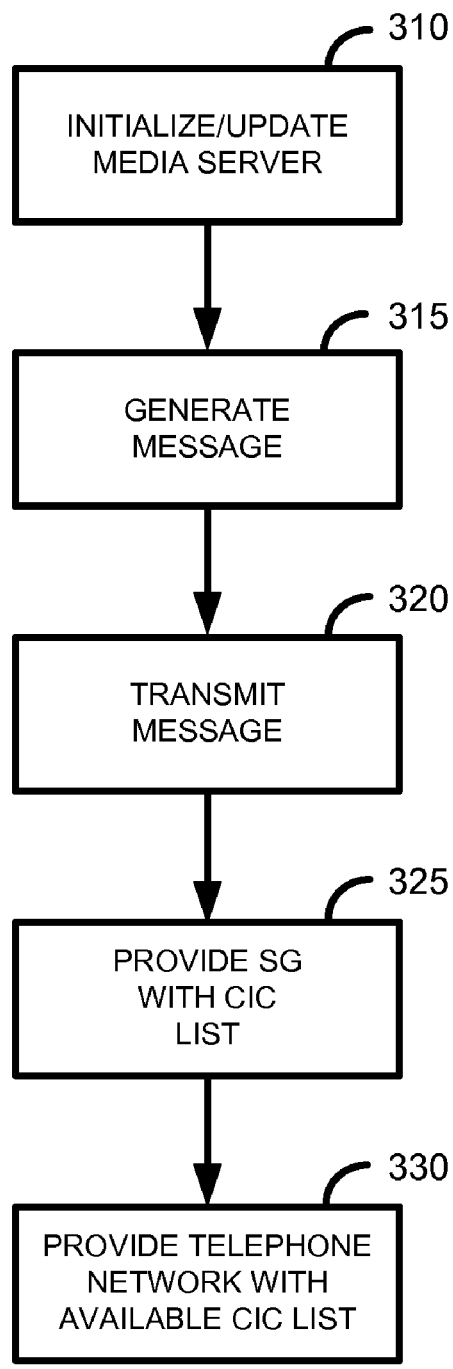
FIG. 3 is an exemplary flow diagram for performing auto discovery.

Referring to FIG. 3, in step 310, when a Media Server 110 or another element is inserted into the distributed voicemail system 100, the inserted element is initialized and/or updated. For example, in the case of a media server being inserted into the distributed voicemail system 100, the inserted media server is provided with a CIC list as part of its initialization. Typically, Media Servers include at least one input interface through which information such as CIC lists can be provided. In another example, if a Media Server is changed, e.g., another link-termination component 120 is added to the Media Server, then the Media Server is provided with an updated CIC list that includes the CICs for the newly added link-termination component 120. Link-termination components 120 can be added to replace malfunctioning link-termination components and/or to increase the capabilities of the Media Server 110.

In step 315, the newly inserted (or changed) element generates a message. Typically, the message includes an element-identifier and for the case of a media server a CIC list. The CIC list can be a complete list of all CICs terminated at the Media Server or a partial list that includes CICs that are now operable. In step 320, the message is transmitted over the network 117. Typically, the message is transmitted to the SMU 105.

In step 325, the SG 115 is provided with the CIC list. Generally, the CIC list is provided to the SG 115 by the SMU 105 responsive to the SMU receiving the CIC list from the changed/updated/newly added Media Server 110. However, in alternative embodiments, the CIC list can be transmitted to the SG 115 by changed/updated/newly added Media Servers 110.

In step 330, the SG 115 forwards this information to the telephone network 130 and the resources of the newly inserted/changed/updated Media Server are then available for use. The new element is then included as part of the network of elements which are monitored and maintained on a regular basis. Similar to the initialization process within the Auto Block function, the SG 115 informs the telephone network 130 that CICs are available by issuing a standard SS7 command that identifies a CIC or a range of CICs that are available for use by the telephone network 130.

It should be emphasized that the above-described embodiments of the present invention, particularly, any "preferred" or "exemplary" embodiments, are merely possible examples of implementations, merely set forth for a clear understanding of the principles of the invention. Many variations and modifications may be made to the above-described embodiment(s) of the invention without departing substantially from the spirit and principles of the invention. It should also be appreciated that any particular embodiment may include only some of the various aspects of the present invention. All such modifications and variations are intended to be included herein within the scope of this disclosure and the present invention and protected by the following claims.

What is claimed is:

1. A voice messaging system based on a distributed architecture that provides discovery functions, the voice messaging system comprising:

a media server having an interface to a telephone network, the media server, when connected to the voice messaging system, being operable to:

receive a carrier identification code list;

act as termination points for a first set of links coming from the telephone network;

establish a client connection to a signal gateway upon initialization; and provide the signal gateway with carrier identification codes terminated by the media server;

a signal gateway being geographically distributed from the media server and interfacing with the media server over an IP network, the signal gateway being operable to:

communicate to the telephone network which carrier identification codes are operable on the media server.

2. The voice messaging system of claim 1, wherein the signal gateway is further operable to:

determine whether the first media server is functioning properly; and responsive to determining that the media server is not functioning properly, provide the telephone network with a message, whereby the telephone network uses the message to route calls to an alternate media server.

3. The voice messaging system of claim 1, wherein the signal gateway is further operable to:

auto-detect at least a third media server responsive to the third media server being operable and connected to the IP network.

4. A voice messaging system comprising:

a signal gateway having a network interface, the signal gateway being operable to:

detect the presence of a media server after the media server is communicatively coupled to the voice messaging system;

receive a list of carrier identification codes from the detected media server; and communicate to a telephone network which carrier identification codes are operable on the detected media server.

5. The voice messaging system of claim 4, wherein the signal gateway is further operable to:

monitor the media server and determine the operating status of the media server; and responsive to determining that the operating status of the media server is undesired, providing a signal to the telephone network via the network interface, whereby the telephone network re-routes calls away from the media server responsive to receiving the message.

6. The voice messaging system of claim 4, wherein the signal gateway monitors the media server via communications carried over an IP network.

7. The voice messaging system of claim 6, wherein the detected media server includes a heartbeat signal and the signaling gateway is further operable to use the heartbeat message to determine that the media server is functioning.

8. The voice messaging system of claim 7, wherein the signal gateway is further operable to ping the media server responsive to not receiving the heartbeat message.

9. The voice messaging system of claim 4, wherein the signal gateway is further operable to:

receive a message identifying updated carrier identification codes; and signal the telephone network via that updated carrier identification codes are available for terminating calls.

10. The voice messaging system of claim 4, further including:

a system management unit in communication with the media server, wherein responsive to the media server being initiated, the system management unit auto-detects the media server.

\* \* \* \* \*